(12) United States Patent
Koike et al.

(10) Patent No.: US 6,239,577 B1
(45) Date of Patent: May 29, 2001

(54) ELECTROMAGNETIC INDUCTION TYPE CHARGING DEVICE

(75) Inventors: Yasuhiro Koike; Masaaki Kaneko; Takashi Hyogo; Hirohisa Shojima, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/526,282

(22) Filed: Mar. 15, 2000

(30) Foreign Application Priority Data

Mar. 25, 1999 (JP) ................... 11-081190
Dec. 16, 1999 (JP) ................... 11-357264

(51) Int. Cl.[7] ........................................... H02J 7/00
(52) U.S. Cl. ............................................. 320/108

(58) Field of Search ................................. 320/108

(56) References Cited

FOREIGN PATENT DOCUMENTS

| 7-039077 | 2/1995 | (JP) . |
| 8-237890 | 9/1996 | (JP) . |
| 10-322919 | 12/1998 | (JP) . |
| 11-191930 | 7/1999 | (JP) . |

*Primary Examiner*—Peter S. Wong
*Assistant Examiner*—Pia Tibbits
(74) *Attorney, Agent, or Firm*—Morgan & Finnegan, LLP

(57) ABSTRACT

An electromagnetic induction type charging device for charging a battery device has a charging paddle and a receptacle. The charging paddle has an infrared communication apparatus for communicating between the paddle and the receptacle. The housing of the charging paddle is made of a material that transmits infrared waves.

19 Claims, 7 Drawing Sheets

ELECTROMAGNETIC INDUCTION TYPE CHARGING DEVICE

BACKGROUND OF THE INVENTION

The present invention relates to electromagnetic induction type charging devices for charging batteries of electric vehicles through electromagnetic induction.

Generally, there are two types of charging devices for electric vehicles, that is, a conductive type and an inductive type. Both types have a charging paddle connected with a power supply located at a fixed position. A typical electric vehicle has a receptacle for receiving power to charge its battery. The conductive type charging device charges the battery when the charging paddle contacts the receptacle. In this case, the charging paddle and the receptacle function as conductors. However, the inductive type charging device charges the battery through electromagnetic induction. In other words, the charging paddle need not be in contact with the receptacle when charging the vehicle's battery. Thus, the inductive type charging device is more reliable than the conductive type charging device. Furthermore, the inductive type charging device minimizes the size of the receptacle of the electric vehicle.

As shown in FIG. 9, a typical inductive type charging device includes a cable 82, a power supply 81, and a charging paddle 83. The cable 82 connects the charging paddle 83 to the power supply 81. The charging paddle 83 has a housing 83a accommodating a ferrite core 84 and a primary coil 85 wound around the core 84. For charging a battery of an electric vehicle, the charging paddle 83 is inserted in a slot (not shown) of a receptacle (not shown) of the vehicle. The receptacle has a secondary coil. When the charging paddle 83 is inserted in the receptacle slot, the power supply 81 supplies alternating current to the primary coil 85 of the charging paddle 83. The primary coil 85 thus induces electromotive force in the secondary coil of the receptacle for charging the battery of the vehicle.

The inductive type charging device includes a controller for controlling the charging operation of the charging device. For example, the controller locks, or suspends, the charging operation until the charging paddle 83 is coupled with the receptacle. The controller also determines a target charging speed (target electric current) based on parameters such as the voltage of the battery and monitors the voltage of the battery while charging the battery. The controller executes these procedures in accordance with information sent by radio communication between the charging paddle 83 and the receptacle of the vehicle. Specifically, the charging paddle 83 includes an antenna 86 for performing radio communication with an antenna (not shown) of the vehicle's receptacle. A typical frequency band employed in the radio communication ranges from several hundreds MHz to several thousands MHz.

However, the frequency band available for radio communication varies among different countries or regions. Thus, it is necessary to provide different types of charging paddles and corresponding receptacles that are applicable to different frequency bands, for example, a type for Japan, a type for U.S.A., and a type for Europe. As more types of charging paddles and corresponding receptacles are required, the manufacturing costs will increase.

Furthermore, other radio devices such as cellular phones are often mounted in the vehicle. The radio waves emitted by these devices may cause noise in the radio communication performed by the charging device, and the radio waves emitted by the charging device cause noise in the other devices.

To solve this problem, Japanese Unexamined Patent Publication No. 10-322919 describes a charging device for electric vehicles that employs optical communication. The optical communication is not affected by radio noise of the devices mounted in the vehicle and transmits information in a stable manner. Specifically, this charging device employs an infrared type optical communication element.

The charging device includes a resin housing for accommodating the charging paddle. The housing has a window for passing the infrared ray emitted by the communication element. That is, the housing includes a recess formed at a position corresponding to a light path of the optical communication element. A transparent, synthetic resin window is fitted in the recess such that the outer surface of the window is flush with the outer surface of the housing. In other words, it is necessary to manufacture the window separately from the protective housing. This structure increases the number of the housing parts and complicates assembly.

Furthermore, since the window is adhered to the housing, the window becomes loose from the housing when the adhesive deteriorates. Thus, a space may be formed between the window and the housing, which unseals the housing. Furthermore, the window may eventually separate from the housing.

Furthermore, the receptacle mounted in the vehicle needs to be miniaturized for saving space. If the receptacle is miniaturized, the charging paddle also must be miniaturized to match the receptacle.

In addition, since the charging paddle is symmetric, the charging paddle may be inserted in the receptacle with the wrong side of the paddle facing the communication element of the receptacle. That is, the communicating element of the charging paddle will not be located at an optimal position for communicating with the communicating element of the receptacle.

SUMMARY OF THE INVENTION

Accordingly, it is a first objective of the present invention to provide an electromagnetic induction type charging device that performs infrared ray communication between a charging paddle and a receptacle of an electric vehicle to ensure high communication reliability, even with a paddle housing formed entirely of non-transparent resin.

It is a second objective of the present invention to provide a charging device having a charging paddle that can be inserted in a receptacle regardless of which side of the charging paddle faces the communicating element of the receptacle.

It is a third objective of the present invention to miniaturize a charging device employing infrared ray communication.

To achieve the above objective, the present invention provides an electromagnetic induction type charging paddle for engaging a receptacle to charge a battery. The charging paddle has a first coil, a first infrared communication apparatus sends or transmits data between the first communication apparatus and a second communication apparatus. A housing of the charging paddle accommodates the first coil and the first communication apparatus. The housing is made of a material that transmits infrared waves.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An electromagnetic induction type charging device for electric vehicles of a first embodiment according to the present invention will now be described with reference to FIGS. 1 to 6.

Figure 6:
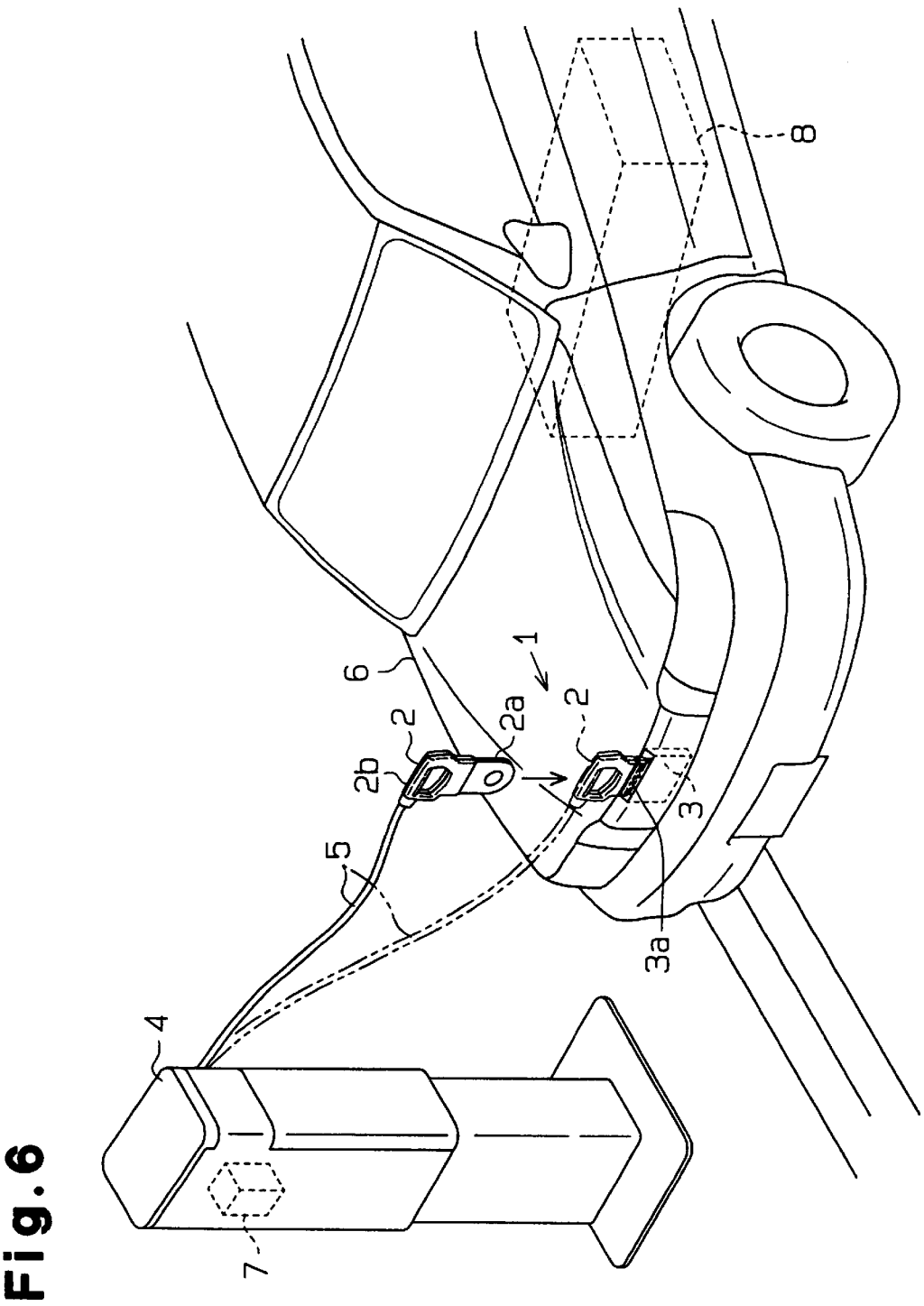
FIG. 6 is a perspective view showing the charging paddle of FIG. 1 connected with a receptacle of an electric vehicle.

As shown in FIG. 6, an electromagnetic induction type (inductive type) charging device 1 includes a charging paddle 2 and a receptacle 3. A power supply 4 is located at a fixed position and has a cable 5 extending from the power supply 4. The charging paddle 2 is secured to the distal end of the cable 5. A receptacle 3 is provided at a predetermined position (for example, in FIG. 6, at the front end of the hood) of an electric vehicle 6. The charging paddle 2 includes an insert 2a and a grip 2b. The insert 2a is inserted in a slot 3a formed in the receptacle 3. The charging paddle 2 and the power supply 4 constitute a feeder apparatus.

When charging a battery 8 of the electric vehicle 6, the insert 2a of the charging paddle 2 is inserted in the slot 3a of the receptacle 3 as indicated by broken lines in FIG. 6. With the charging paddle 2 coupled with the receptacle 3, optical communication is performed between the charging paddle 2 and the receptacle 3. The power supply 4 has a controller 7, which is a control means. The controller 7 supplies an optimal alternating current to the charging paddle 2 through the cable 5 in accordance with information obtained through the optical communication.

The controller 7 locks, or suspends, charging until it is confirmed that the charging paddle 2 is coupled with the receptacle 3 through the optical communication. The controller 7 also detects the voltage of the battery 8 and determines charging conditions such as a target electric current in accordance with the voltage. When the power supply 4 supplies alternating current to the charging paddle 2, the charging paddle 2 electromagnetically induces a current in the receptacle 3. The current is then sent to the battery 8 of the electric vehicle 6 such that the battery 8 is charged. While charging the battery 8, the controller 7 monitors the voltage of the battery 8.

Figure 2:
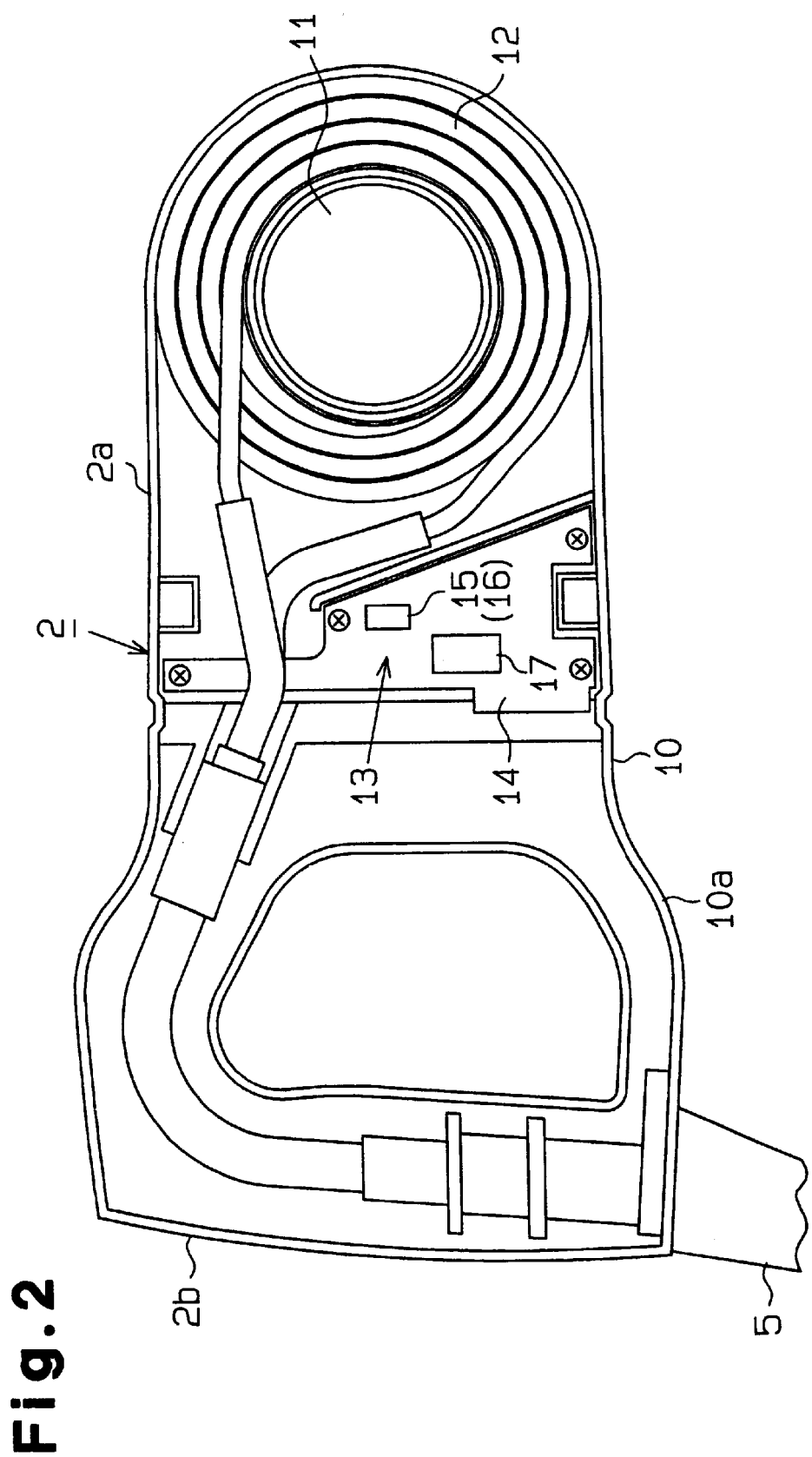
FIG. 2 is a cross-sectional view taken along line 2—2 of FIG. 1.

The configuration of the charging paddle 2 will hereafter be described. As shown in FIG. 2, the charging paddle 2 has a flat housing 10 including the insert 2a and the grip 2b. The housing 10 houses a disk-like ferrite core 11 and a primary coil 12 wound around the core 11. A circuit board 13 is located substantially in the middle of the housing 10. In the first embodiment, the primary coil 12 employs litz wire. As shown in FIG. 13, the wire of the primary coil 12 and a wire 13a of the circuit board 13 are electrically connected with the power supply 4 via the cable 5.

The circuit board 13 has electronic communication components. Specifically, as shown in FIG. 2, the circuit board 13 includes a substrate 14 having a pair of infrared communication elements 15, 16 (only one is shown) and corresponding communication integrated circuits (IC's) 17 (only one is shown). While the infrared communication element 15 is provided on one side of the substrate 14, the opposite infrared communication element 16 is provided on the other side of the substrate 14. In the same manner, the communication IC's 17 are each located on opposite sides of the substrate 14 at positions corresponding to the associated infrared communication elements 15, 16. The communication IC's 17 actuate the infrared communication elements 15, 16. In other words, the apparatus of the first embodiment performs infrared ray communication using the infrared communication elements 15, 16. The communication standard of this embodiment is the IrDA standard with an infrared wavelength of about 880 nm. However, other infrared communication standards and other infrared wavelengths may be employed.

Figure 3:
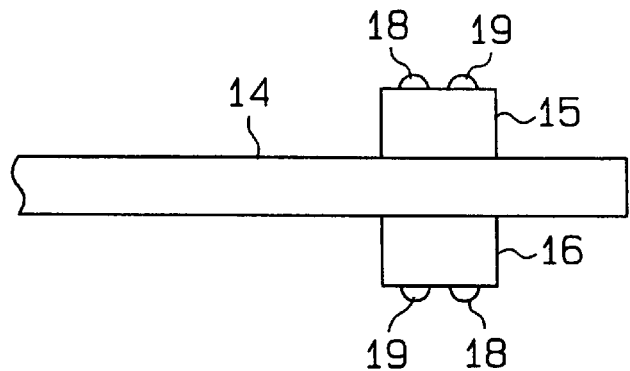
FIG. 3 is a front view showing an infrared communication element provided in the charging paddle of FIG. 1.

As shown in FIG. 3, the infrared communication elements 15, 16 are opposite to each other with the substrate 14 arranged between them. Thus, when the charging paddle 2 is inserted in the receptacle 3, either the infrared communication element 15 or the infrared communication element 16 is located at an optimal position for communicating with a communicating portion of the receptacle 3. That is, the charging paddle 2 may be inserted in the receptacle 3 in either of the two possible orientations, and one of the communication elements will face the communicating portion of the receptacle 3. The infrared communication elements 15, 16 each include an infrared emitter 18 and an infrared receiver 19.

The housing 10 is formed of infrared ray transmitting resin. Specifically, the housing 10 is formed of infrared ray-transmitting polycarbonate resin coated with a non-transparent infrared wave-transmitting paint. As described above, if a separate window of infrared ray transmitting resin is fitted in a portion of the housing corresponding to the infrared path, the number of housing parts increases, thus complicating the assembly of the housing. However, in this embodiment, since the entire housing 10 is formed of infrared wave transmitting resin, this problem is avoided.

The communication IC's 17 constitute part of a communication circuit between the infrared communication elements 15, 16 and the controller 7. Each communication IC 17 functions as a driver for controlling the operation of the associated communication element 15, 16 in accordance with signals received mainly from the controller 7. The communication IC 17 includes a filtering circuit for filtering noise from the signals. The communication IC 17 further includes an amplifying circuit for amplifying the signals. The filtering circuit and the amplifying circuit of the communication IC's 17 are located in the vicinity of the associated infrared communication elements 15, 16.

Figure 4:
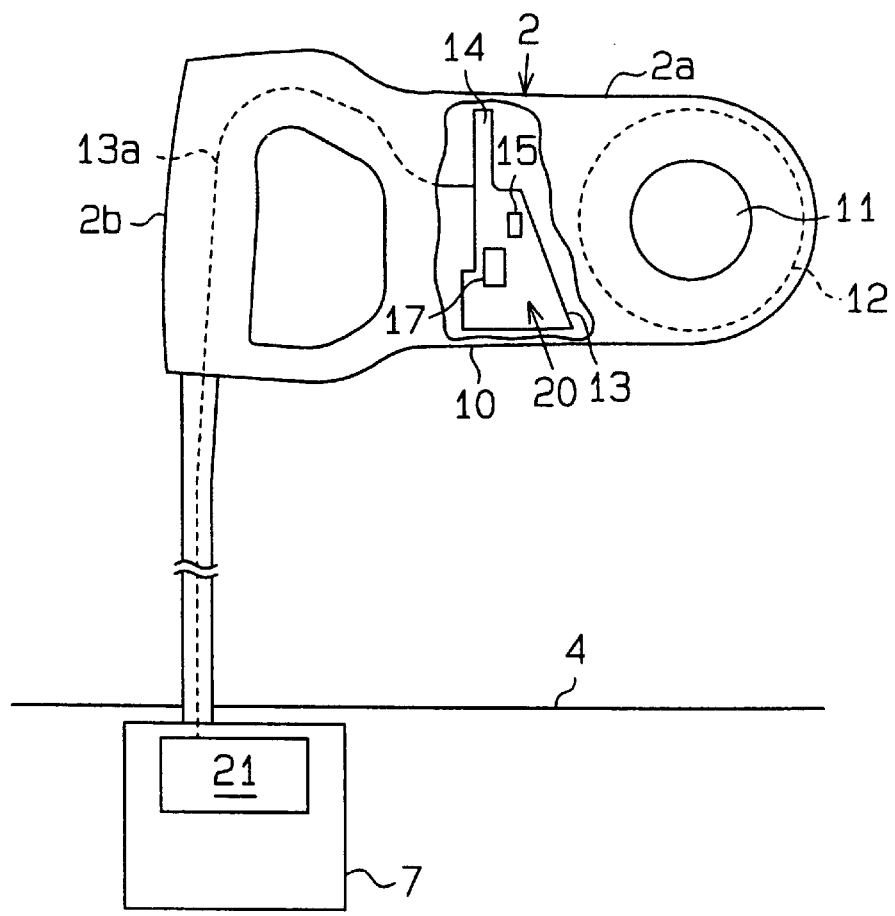
FIG. 4 is a view showing the charging paddle of FIG. 1 connected with a power supply.

The communication circuit between the infrared communication elements 15, 16 and the controller 7 includes a first unit 20 and a second unit 21. As shown in FIG. 4, the first unit 20 is accommodated in the charging paddle 2 and is located in the vicinity of the infrared communication elements 15, 16. The second unit 21 is incorporated in the controller 7.

The second unit 21 has a pulse control circuit and a filtering circuit. The pulse control circuit modulates the operating frequency such that the communication standard of the controller 7 matches the IrDA standard. The filtering circuit filters noise from signals sent to the controller 7 by the infrared receivers 19 of the infrared communication elements 15, 16.

In the first embodiment, the communication circuit has two parts: the first unit 20 and the second unit 21. Only the first unit 20 is accommodated in the housing 10 of the charging paddle 2. This structure decreases the number of parts in the housing 10 of the charging paddle 2. Specifically, the first unit 20 does not include the infrared communication elements 15, 16 but includes the remainder of the circuit board 13. The first unit 20 and the second unit 21 constitute a first circuit and a second circuit, respectively.

Figure 1:
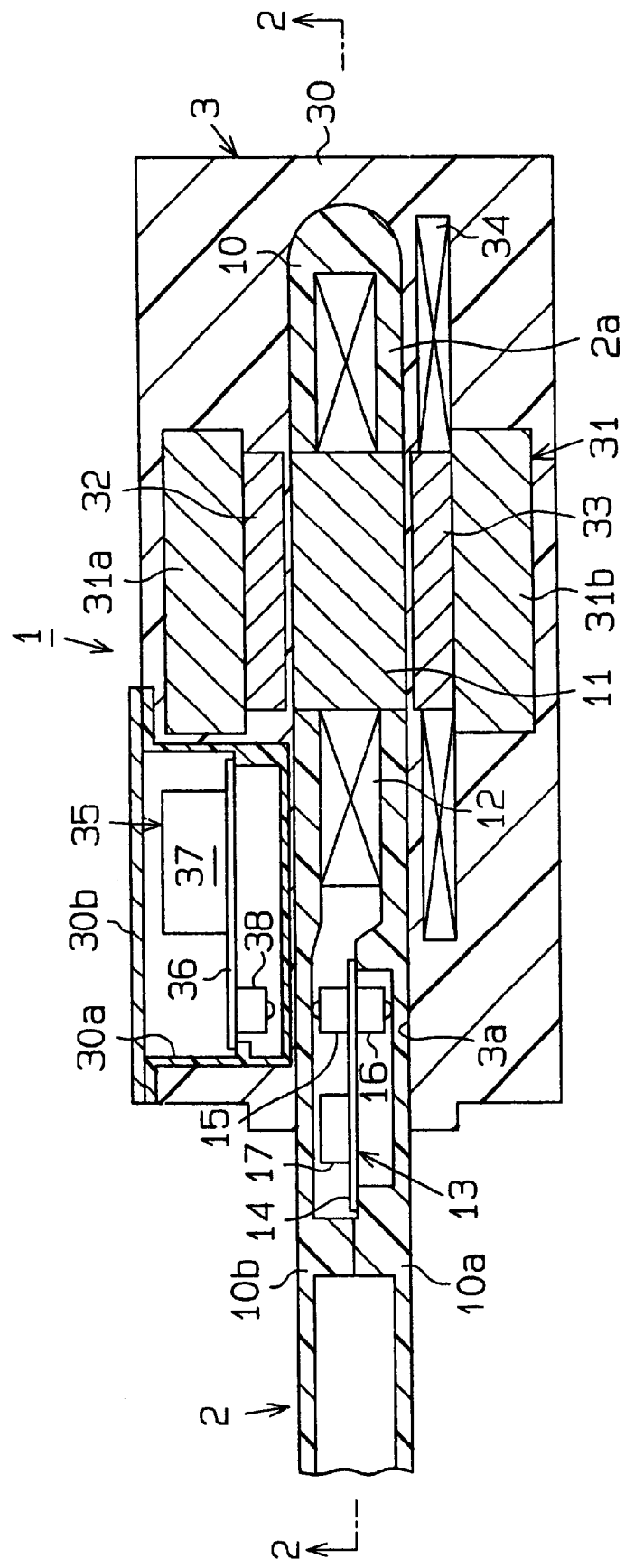
FIG. 1 is a cross-sectional view showing a charging paddle of an electromagnetic induction type charging device of a first embodiment according to the present invention.

The charging paddle 2 is inserted in the receptacle 3, as shown in FIG. 1. The housing 10 of the charging paddle 2 includes a pair of housing portions 10a, 10b. The housing portions 10a, 10b are coupled with each other through vibrating deposition to form the housing 10. The ferrite core 11 is incorporated in the charging paddle 2 such that the sides of the charging paddle 2 are flush with the ends of the ferrite core 11, respectively.

The configuration of the receptacle 3 will hereafter be described with reference to FIG. 1.

The receptacle 3 has a housing 30 secured to the electric vehicle 6. A ferrite core 31 is accommodated in the housing 30. When the insert 2a of the charging paddle 2 is inserted in the slot 3a of the receptacle 3, the ferrite core 11 of the charging paddle 2 opposes the ferrite core 31 of the receptacle 3. The ferrite core 31 is shaped substantially like a square frame to encompass the insert 2a. The ferrite core 31 includes a pair of beam-like yokes 31a, 31b. A pair of disk-like pole projections 32, 33 are each projected from the associated yokes 31a, 31b toward the ferrite core 11. A secondary coil 34 is wound around the pole projection 33. When the insert 2a of the charging paddle 2 is inserted in the slot 3a of the receptacle 3, the ferrite core 11 is located between the pole projections 32, 33. In this state, the ferrite core 11, the primary coil 12, and the secondary coil 34 define a closed magnetic circuit.

The housing 30 has a cavity 30a located near the slot 3a for accommodating a circuit board 35, which is a communication device. The cavity 30a has an opening covered by a lid 30b. The circuit board 35 has a substrate 36 including a communication IC 37 and an infrared communication element 38. When the insert 2a of the charging paddle 2 is received in the slot 3a of the receptacle 3, the infrared communication element 38 of the receptacle 3 opposes one of the infrared communication elements 15, 16 of the charging paddle 2, and the housing portion 10b is arranged between the communication elements. In this manner, the infrared communication element 38 of the receptacle 3 communicates with the corresponding infrared communication elements 15, 16 of the charging paddle 2.

Figure 5:
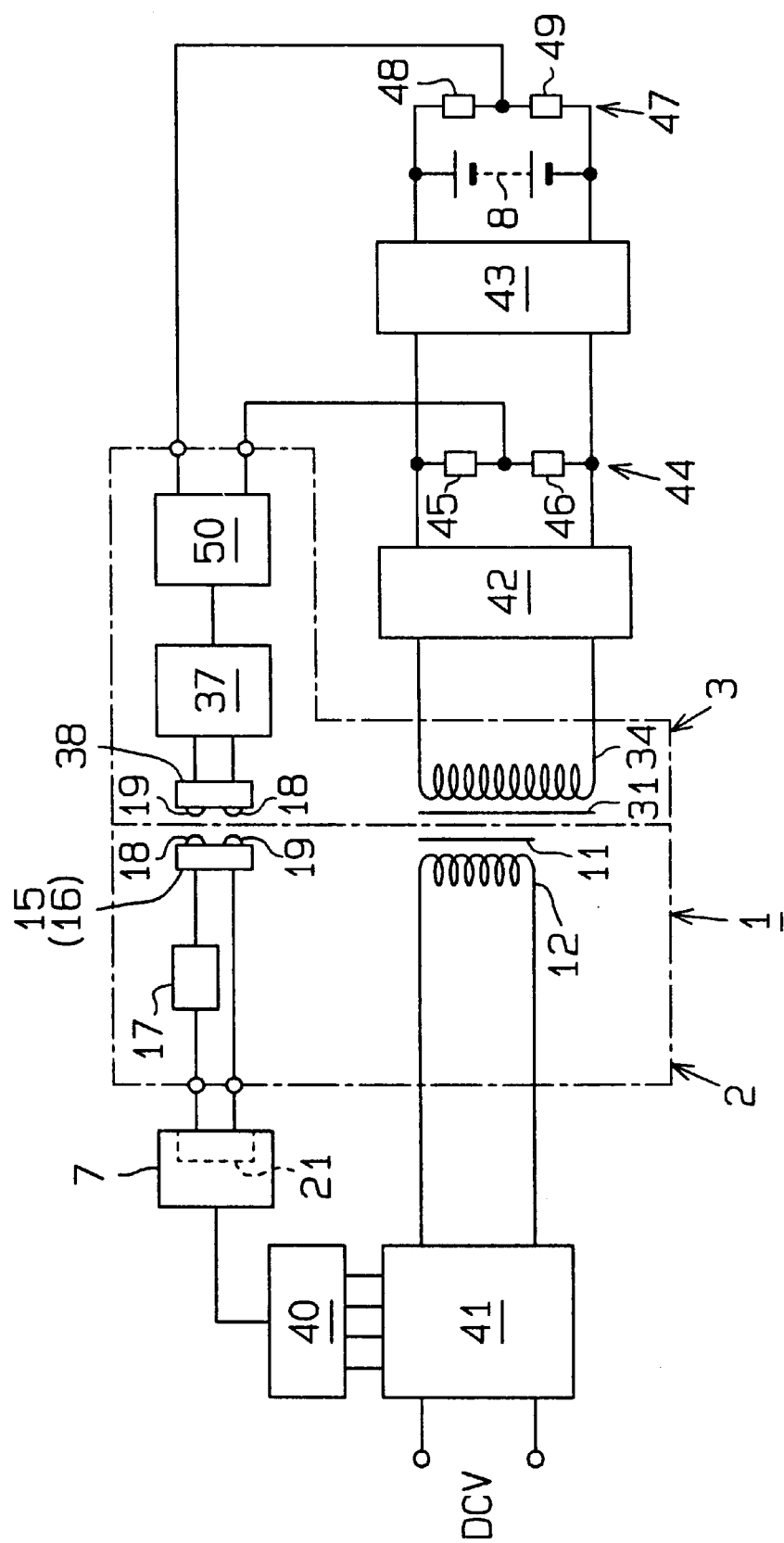
FIG. 5 is an electric circuit diagram of the charging device of FIG. 1.

The electrical configuration of the charging device 1 will be hereafter discussed with reference to the circuit diagram of FIG. 5.

The controller 7 controls an inverter 41 by means of a gate controller 40 in accordance with signals from the infrared communication elements 15, 16. The inverter 41 is a normal, single phase inverter having an H-shaped bridge structure including four IGBT's. Alternating current from an external power source (not shown) is rectified such that direct current voltage is obtained. The obtained direct current voltage is then converted by the inverter 41 into alternating current voltage having a frequency of about 10 kHz to 100 kHz. The resulting alternating current is sent to the primary coil 12. The primary coil 12 then electromagnetically induces an alternating current voltage in the secondary coil 34. The alternating current voltage is then rectified by a rectifying circuit 42. Subsequently, the alternating current voltage is smoothed by a smoothing circuit 43 and supplied to the battery 8.

A first voltage dividing circuit 44 has a pair of resistance elements 45, 46 connected in series. The resistance elements 45, 46 each have a relatively high resistance. A second voltage dividing circuit 47 has a pair of resistance elements 48, 49 connected in series. The resistance elements 48, 49 each have a relatively high resistance. The first voltage dividing circuit 44 divides the voltage applied from the rectifying circuit 42 and sends an analog signal indicating the obtained value to a controller 50. The second voltage dividing circuit 47 divides the voltage of the battery 8 and sends an analog signal indicating the obtained value to the controller 50. The controller 50 determines that the battery 8 is being charged when the signal from the first voltage dividing circuit 44 indicates an increased value. The controller 50 converts the analog signal sent from the second voltage dividing circuit 47 to digital form. The controller 50 determines the state of the battery 8 in accordance with the obtained digital signal.

When the charging paddle 2 is separated from a hook (not shown) of the power supply 4, the infrared emitter 18 of the corresponding infrared communication element 15 (16) emits infrared waves. When the insert 2a of the charging paddle 2 is inserted in the receptacle 3, a locking signal for suspending the charging operation is sent through the infrared communication element 15 (16) to the controller 50. The controller 50 receives the locking signal through the infrared communication element 38.

Subsequently, the controller 50 instructs the infrared emitter 18 of the infrared communication element 38 through the communication IC 37 to send a permission signal for permitting the charging operation and a voltage signal indicating the voltage of the battery 8 to the controller 7. The controller 7 receives the permission signal and the voltage signal through the corresponding infrared communication element 15 (16). If the voltage of the battery 8 indicated by the voltage signal is lower than a predetermined value, the controller 7 determines that the battery 8 needs be charged. The controller 7 then controls the gate controller 40 such that the charging operation is initiated with power corresponding to the current voltage of the battery 8.

While the charging operation is being performed, the controller 50 periodically sends the digital signal indicating the voltage of the battery 8 to the controller 7 through communication between the infrared communication element 38 and the corresponding infrared communication element 15 (16). The digital signal sent from the controller 50 enables the controller 7 to monitor the voltage of the battery 8. Accordingly, the controller 7 supplies an optimal electric current to the battery 8 depending on the voltage of the battery 8. When the digital signal indicates that the voltage of the battery 8 has reached a predetermined value, the controller 7 acknowledges that the battery 8 is fully charged. The controller 7 then instructs the gate controller 40 to stop the charging operation.

The first embodiment has the following advantages.

In the first embodiment, infrared communication is performed between the charging paddle 2 and the receptacle 3. This structure enables the charging device 1 to use one international communication standard. That is, unlike a charging device using radio communication, the communication standard of the charging device 1 need not be altered for matching different frequency bands of different countries or regions. In other words, it is possible to manufacture charging devices in accordance with a single international communication standard. Furthermore, the charging device 1 does not cause noise in other radio communication devices mounted in the electric vehicle 6 such as cellular phones.

The housing 10 of the charging paddle 2 is formed of infrared ray transmitting resin. Thus, when an infrared signal passes through the housing 10, the signal intensity is not damped. This structure increases the communication reliability of the charging device 1. Furthermore, since the entire housing 10 is formed of infrared ray transmitting resin, it is not necessary to provide a separate window of infrared ray transmitting resin. This structure decreases the number of housing parts, thus simplifying the assembly of the housing 10. Accordingly, the cost for manufacturing the charging paddle 2 is reduced. In addition, since the housing 10 of the first embodiment does not include a separate window piece, the problems of the prior art not occur.

Non-transparent resin is used for this invention. The resin transmits the infrared waves but not visible light. Therefore, the interior of the charging paddle is not visible form outside the housing while the battery is being charged, which is preferred.

In the first embodiment, the communication circuit between the infrared communication elements 15, 16 and the controller 7 is divided into two sections: the first unit 20 and the second unit 21. Since the first unit 20 must be located in the vicinity of the infrared communication elements 15, 16, the first unit 20 is accommodated in the housing 10 of the charging paddle 2. However, the second unit 21 is incorporated in the controller 7, which is provided in the power supply 4. This arrangement minimizes the number of parts in the housing 10 of the charging paddle 2, thus permitting the size of the charging paddle 2 to be reduced.

In the first embodiment, a pair of infrared communication elements 15, 16 are each provided on opposite sides of the charging paddle 2. Thus, when the insert 2a of the charging paddle 2 is located in the slot 3a of the receptacle 3, communication is ensured between the charging paddle 2 and the receptacle 3, without considering which side of the charging paddle 2 faces the communication element 38 of the receptacle 3. In other words, the charging paddle 2 may be inserted in the receptacle 3 regardless which side of the charging paddle 2 faces the communication element 38.

A second embodiment of the present invention will hereafter be described with reference to FIGS. 7 and 8.

In the second embodiment, a single infrared communication element 15 is provided in the charging paddle 2. In the following, the difference between the first embodiment illustrated in FIGS. 1 to 6 and the second embodiment will mainly be discussed. Same or like reference numerals are given to same or like components.

Figure 7:
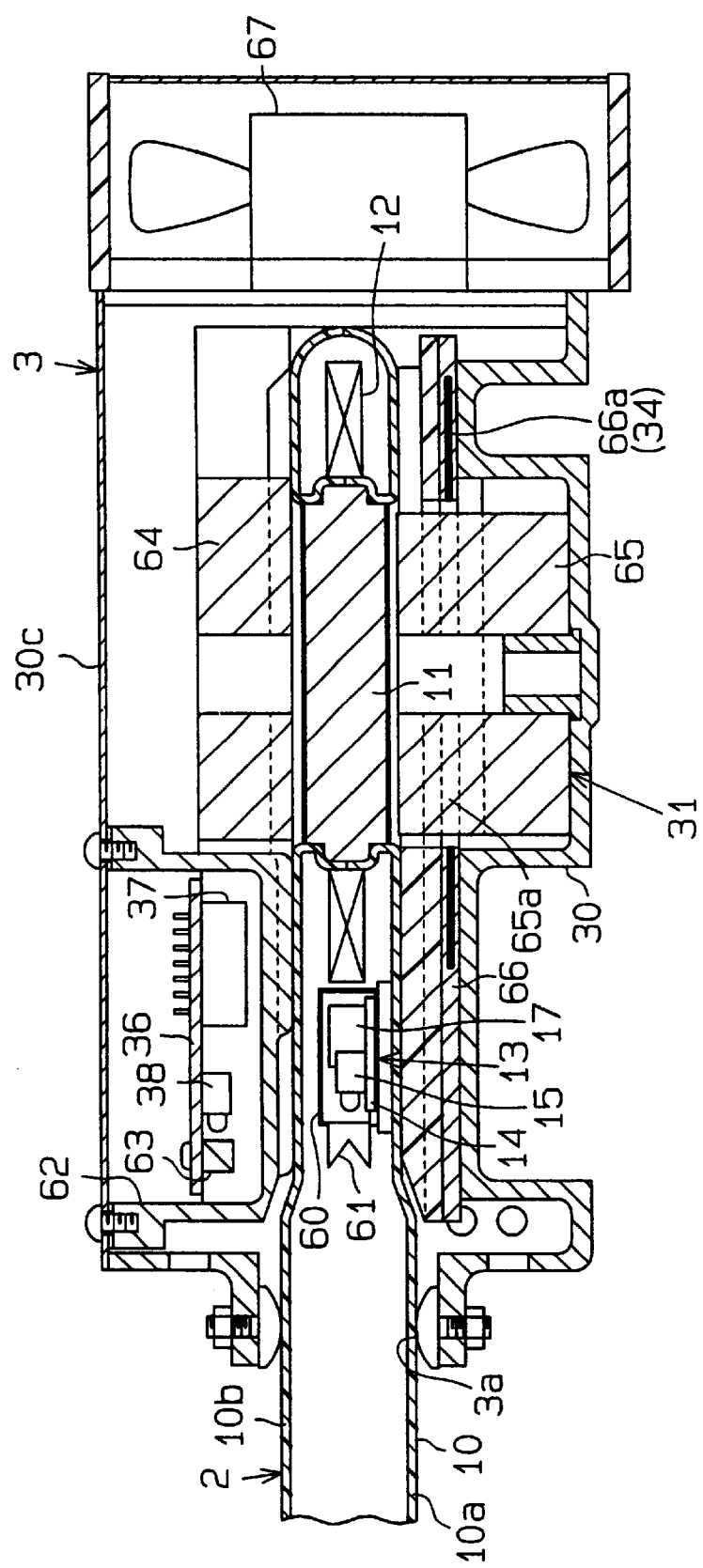
FIG. 7 is a cross-sectional view showing a charging paddle of an electromagnetic induction type charging device of a second embodiment according to the present invention.

FIG. 7 is a cross-sectional view schematically showing the charging paddle 2 of the second embodiment coupled with the receptacle 3. Like the first embodiment, the housing 10 of the second embodiment is formed by coupling the housing portions 10a, 10b through vibrating deposition. The housing 10 is formed entirely of infrared wave transmitting resin.

Figure 8:
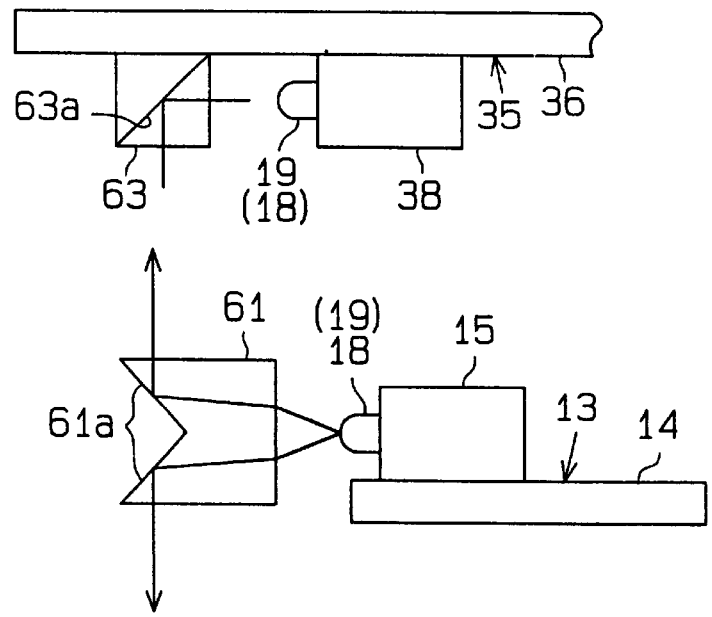
FIG. 8 is a side view showing an infrared communication element provided in the charging paddle of FIG. 7.
Figure 9:
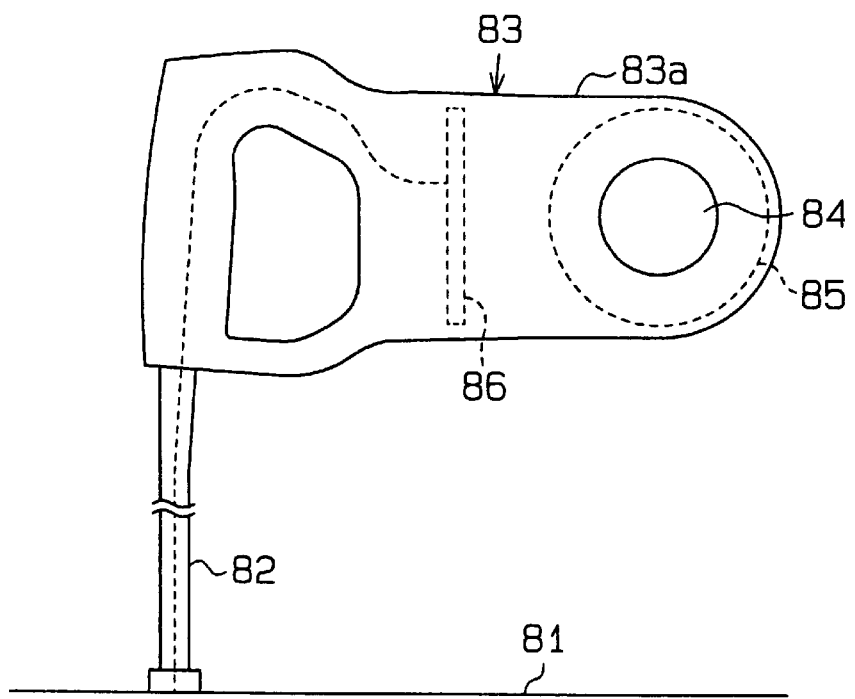
FIG. 9 is a view showing a prior art charging paddle connected with a power supply.

As shown in FIGS. 7 and 8, the circuit board 13 of the charging paddle 2 is housed in a water-proof casing 60 formed of transparent synthetic resin. An infrared communication element 15 is provided on the circuit board 13. The infrared communication element 15 includes the infrared emitter 18 and the infrared receiver 19, like the first embodiment. The infrared communication element 15 is located in the charging paddle 2 such that the infrared emitter 18 of the element 15 emits waves along a path parallel to the sides of the charging paddle 2, and the infrared receiver 19 of the element 15 receives light along a similar path.

A prism 61, which is a spectral diffraction means, is secured to the water-proof casing 60 and is aligned with the emitter 18 and the receiver 19 of the infrared communication element 15. As shown in FIG. 8, the prism 61 includes a refraction surface 61a for dividing an infrared beam emitted by the infrared emitter 18 into two beams. When the insert 2a of the charging paddle 2 is received in the slot 3a of the receptacle 3, the beams extend in opposite directions along a path perpendicular to the substrate 36 of the circuit board 35 on which the infrared communication element 38 is located.

The housing 30 of the receptacle 3 is formed of metal. A box 62 formed of infrared ray transmitting resin is accommodated in the housing 30 and houses the circuit board 35, which is a communication device. When the insert 2a of the charging paddle 2 is received in the slot 3a of the receptacle 3, the circuit board 35 substantially faces the circuit board 13 of the charging paddle 2. The circuit board 35 includes the infrared communication element 38, which includes an infrared emitter 18 and an infrared receiver 19. The infrared communication element 38 is located on the circuit board 35 such that infrared emitter 18 of the element 38 infrared waves along a path parallel to the sides of the charging paddle 2, and the receiver 19 of the element 38 receives infrared waves along a similar path. prism 63, which is a spectral diffraction means, is located on the circuit board 35 and is aligned with the infrared emitter 18 and the infrared receiver 19 of the infrared communication element 38.

The prism 63 includes a refraction surface 63a for refracting infrared waves emitted by the emitter 18 of the infrared communication element 38. The infrared beam refracted by the refraction surface 63a extends to the prism 61 of the charging paddle 2. The light is then refracted by the refraction surface 61a and is directed to the infrared receiver 19 of the infrared communication element 15. On the other hand, light emitted by the infrared emitter 18 of the infrared communication element 15 is refracted by the refraction surface 61a of the prism 61 and proceeds to the prism 63 of the receptacle 3. The light is then refracted by the refraction surface 63a of the prism 63 and is directed to the infrared receiver 19 of the infrared communication element 38.

The housing 30 includes the lid 30c closing the opening of the box 62. The ferrite core 31 of the receptacle 3 includes a flat I-shaped core 64 and an E-shaped core 65 having a cylindrical pole projection 65a. When the insert 2a of the charging paddle 2 is received in the slot 3a of the receptacle 3, the ferrite core 11 is located between the cores 64, 65. In this state, a magnetic circuit is formed by the ferrite core 11, the I-shaped core 64, the E-shaped core 65, the coil 12 of the charging paddle 2, and a coil board 66. The coil board 66 includes a coil wire 66a. A cooling fan 67 is secured to an end of the housing 30. When the fan 67 is activated, air flows along the charging paddle 2 in the housing 30, thus cooling the interior of the housing 30 heated by the coil 12 and the coil board 66.

The second embodiment has the following advantages.

In the second embodiment, the charging paddle 2 includes only one infrared communication element 15. However, when the insert 2a of the charging paddle 2 is located in the slot 3a of the receptacle 3, the infrared communication element 15 reliably communicates with the infrared communication element 38 of the receptacle 3 regardless of which side of the charging paddle 2 faces the infrared communication element 38. Furthermore, the beam from the infrared communication element 15 extends longitudinally parallel to the sides of the charging paddle 2, thus minimizing the dimension between the sides of the charging paddle 2.

In the second embodiment, the prism 63 refracts the beam emitted by the infrared emitter 18 of the infrared communication element 38. The light thus proceeds toward the infrared receiver 19 of the infrared communication element 15 of the charging paddle 2. The prism 38 also refracts the beam emitted by the emitter 18 of the infrared communication element 15 of the charging paddle 2. The beam thus proceeds toward the receiver 19 of the infrared communication element 38 of the receptacle 3. This structure increases the acceptable range of positions for locating the infrared communication element 38 in the receptacle 3. Furthermore, the infrared communication element 38 extends longitudinally parallel to the sides of the charging paddle 2, thus minimizing the dimension between the corresponding sides of the receptacle 3.

As described above, the structure of the second embodiment minimizes the size of the charging paddle 2 and the receptacle 3. The electromagnetic induction type charging device 1 is relatively small.

The present invention may be modified as follows.

The charging paddle 2 may include an antenna in addition to the infrared communication element 15. The charging paddle 2 may thus be used both for electric vehicles having prior-art radio communication type receptacles and those having infrared ray communication type receptacles.

While the charging paddle 2 includes a single infrared communication element, a pair of infrared communication elements may be provided in the receptacle 3 at positions corresponding to opposite sides of the charging paddle 2. In this structure, when the charging paddle 2 is inserted in the receptacle 3, the infrared communication element of the charging paddle 2 faces one of the infrared communication elements of the receptacle 3. The infrared communication between the charging paddle 2 and the receptacle 3 is thus ensured.

The communication circuit between the infrared communication elements 15, 16 and the controller 7 is divided into the first unit 20 and the second unit 21. Only the first unit 20 is in the housing 10 of the charging paddle 2. However, the entire communication circuit may be located in the housing 10. Furthermore, if the communication circuit is divided into sections, the circuits types are not restricted to the embodiments illustrated in FIGS. 1 to 8.

The infrared wave transmitting resin forming the housing 10 is not restricted to the non-transparent resin coated with infrared wave transmitting paint. Any resin may be used for forming the housing 10 as long as the resin transmits infrared waves.

Each infrared communication element may include only a light emitter or a light receiver. In other words, the infrared ray communication may be performed in a one-way manner.

Although the charging paddle 2 is inserted in the receptacle 3, the charging paddle 2 may be coupled with the receptacle 3 in a different manner. For example, the charging paddle 2 may be magnetically coupled with the receptacle 3. Alternatively, the charging paddle 2 may be engaged with the receptacle 3.

Each infrared communication element may have a two-part structure having a light emitter and a light receiver.

Information transmitted through infrared communication is not restricted to data concerning the charging of the battery 8. For example, data concerning the vehicle's engine may be transmitted through infrared ray communication while the battery 8 is being charged is an engine-driven vehicle.

The present invention may be applied to vehicles driven by batteries other than electric passenger cars. For example, the present invention may be applied to industrial vehicles such as battery type forklifts and battery type transport trucks. Furthermore, the present invention may be applied to hybrid vehicles powered by both fuel (for example, gasoline) and batteries.

In addition, the charging paddle 2 and the receptacle 3 according to the present invention may be applied to charging devices of batteries used for purposes other than electric vehicles.

It should be apparent to those skilled in the art that the present invention may be embodied in many other specific forms without departing from the sprit or scope of the invention. Therefore, the present examples and embodiments are to be considered as illustrative and not restrictive and the invention is not to be limited to the details given herein, but may be modified within the scope and equivalence of the appended claims.

What is claimed is:

1. An electromagnetic induction type charging paddle for engaging a receptacle to charge a battery, the charging paddle comprising:
   a first coil;
   a first infrared communication apparatus for sending or transmitting data between the first infrared communication apparatus and a second infrared communication apparatus in the receptacle; and
   a housing for accommodating the first coil and the first infrared communication apparatus, wherein the housing is made of a material that transmits infrared waves.

2. The charging device according to claim 1, wherein the housing is made of a material that is non-transparent.

3. The charging paddle according to claim 1, wherein the paddle can be inserted into the receptacle in either of two orientations, the housing is substantially flat, the charging paddle has a first side and a second side, the second side being opposite to the first side, and wherein the first infrared communication apparatus can communicate with the second infrared communication apparatus regardless of which of the orientations the paddle is in when the charging paddle is inserted in the receptacle.

4. The charging paddle according to claim 3, wherein the first infrared communication apparatus is a pair of infrared communication elements, wherein one of the infrared communication elements is located to face the first side and the other is located to face the second side.

5. The charging paddle according to claim 3, wherein a refractor is located in the charging paddle such that the refractor separates an infrared beam transmitted from the first infrared communication apparatus into a first branch and a second branch, wherein the first branch passes through the first side, and the second branch passes through the second side.

6. The charging paddle according to claim 5, wherein the refractor is a prism.

7. The charging paddle according to claim 1, wherein the material is a polycarbonate resin, and the material is coated with a non-transparent, infrared wave transmitting paint.

8. The charging paddle according to claim 1, wherein a power supply is connected to the charging paddle, and a first communication circuit is provided in the charging paddle and a second communication circuit is provided in the power supply.

9. The charging paddle according to claim 1, wherein the receptacle includes:

an electromagnetic induction coil;

a refractor for directing an infrared beam so that the beam travels between the first infrared communication apparatus and the second infrared communication apparatus.

10. The charging paddle according to claim 1, wherein the first infrared communication apparatus is located such that a longitudinal axis of the first infrared communication apparatus is parallel to the sides of the charging paddle.

11. An electromagnetic induction type charging device contacting a receptacle to charge a battery, wherein the charging device has a charging paddle connected with a power supply, the charging paddle comprising:

a first coil;

a first infrared communication apparatus for sending or transmitting data between the first infrared communication apparatus and a second infrared communication apparatus in the receptacle; and a flat housing for accommodating the first coil and the first infrared communication apparatus, wherein the housing is made of a material that is non-transparent and permits infrared waves to pass through the housing.

12. The charging device according to claim 11, wherein the paddle can be inserted into the receptacle in either of two orientations, the housing is substantially flat, the charging paddle has a first side and a second side, the second side being opposite to the first side, and wherein the first infrared communication apparatus can communicate with the second infrared communication apparatus regardless of which of the orientations the paddle is in when the charging paddle is inserted in the receptacle.

13. The charging device according to claim 12, wherein the first infrared communication apparatus is a pair of infrared communication elements, wherein one of the infrared communication elements is located to face the first side and the other is located to face the second side in the housing of the charging paddle.

14. The charging device according to claim 13, wherein a refractor is located in the charging paddle such that the refractor separates an infrared beam transmitted from the first infrared communication apparatus into a first branch and a second branch, wherein the first branch passes through the first side, and the second branch passes through the second side.

15. The charging device according to claim 14, wherein the refractor is a prism.

16. The charging device according to claim 11, wherein the material is a polycarbonate resin, and the material is coated with a non-transparent, infrared wave transmitting paint.

17. The charging device according to claim 11, wherein a power supply is connected to the charging paddle, and a first communication circuit is provided in the charging paddle and a second communication circuit is provided in the power supply.

18. The charging device according to claim 11, wherein the receptacle includes:

an electromagnetic induction coil;

a refractor for directing an infrared beam so that the beam travels between the first infrared communication apparatus and the second infrared communication apparatus.

19. The charging device according to claim 11, wherein the first infrared communication apparatus is located such that a longitudinal axis of the first infrared communication apparatus is parallel to the sides of the charging paddle.

* * * * *